Feb. 13, 1968  J. J. KIMMEL  3,368,369

SEALED GEAR COUPLING

Filed March 21, 1966

INVENTOR.
JOSEPH J. KIMMEL
BY *Bayce C. Dent*
his Attorney

United States Patent Office 3,368,369
Patented Feb. 13, 1968

3,368,369
SEALED GEAR COUPLING
Joseph J. Kimmel, Baltimore, Md., assignor to Koppers Company, Inc., a corporation of Delaware
Filed Mar. 21, 1966, Ser. No. 535,751
4 Claims. (Cl. 64—9)

ABSTRACT OF THE DISCLOSURE

A gear-type coupling capable of accommodating angular misalignment of two generally aligned shafts is comprised of a hub for each shaft wherein the external teeth of one hub mesh with the internal teeth of the other hub. Sealing elements for the hubs are positioned on a radial plane passing through the center of the axial length of the external teeth.

---

Figure 1:
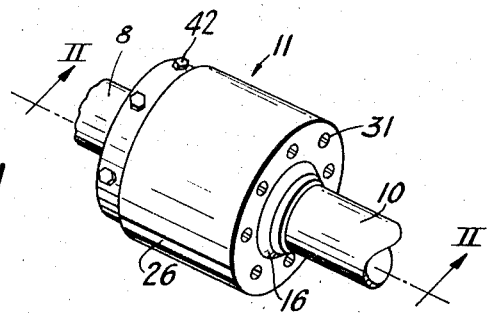

This invention relates generally to flexible couplings for transmitting rotary motion between two generally aligned shafts.

In certain applications, the ability to conduct fluids such as hot gases, cooling water, or lubricating oil from a hollow conduit in a driving shaft to a hollow conduit in a driven shaft through a coupling is desirable. For example, hot exhaust gases from a driving turbine are sometimes vented through the drive shaft. In other applications it is often desirable to be able to conduct lubricating oil through the shafts and the coupling to gear boxes connecting a turbine to the drive shaft through the coupling. Similarly, it may be desirable to conduct cooling water to a gas turbine when it is otherwise difficult to supply the water externally. The supply of such fluids through the coupling presents the problem of isolating the coupling lubricant from the fluid within the shafts and coupling.

Conventional couplings normally use only one seal for the purpose of retaining lubricant within the coupling because it is usually not necessary to separate the lubricant from fluids within the drive shaft as the shaft is usually solid. In cases where hot gases are being conducted through the shafts, the coupling must be capable of transmitting high torque at a high temperature, for example, 500° F. Gear type couplings are particularly advantageous for use in such situations because of their torque-transmitting ability as well as their capacity to compensate for axial misalignment caused by thermal expansion or shaft separation due to structural deflections. Thus, seals provided for sealing fluids within the shafts and lubricant within the working parts of the coupling must not be affected by axial or angular misalignment.

Accordingly, an object of the present invention is to provide a gear-type flexible shaft coupling having means for sealing fluids within hollow portions of the connected shafts and for sealing lubricant within the working parts of the coupling; the effectiveness of the seals being substantially unaffected by axial and angular misalignment of the shafts.

The invention contemplates the provision of a gear-type flexible coupling for connecting a driving shaft to a driven shaft which has a plurality of sealing elements between cooperating sections of the coupling hubs to contain fluids within the shafts and to contain lubricant within the driving parts of the coupling. More specifically, the invention contemplates the provision of a gear-type coupling capable of accommodating angular misalignment of the shafts wherein the external teeth of one hub mesh with the internal teeth of the other hub and sealing elements positioned on a radial plane passing through the center of the axial length of the external teeth.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike:
FIGURE 1 is an isometric view of the preferred embodiment of the novel coupling, and
FIGURE 2 is a radial view of the coupling in partial cross-section along line II—II of FIG. 1.

Referring now to FIG. 1, shaft 8 is connected to shaft 10 by the novel gear-type coupling 11. These shafts are hollow and the coupling 11 is capable of conducting fluids from shaft 8 to shaft 10 or the reverse.

Figure 2:
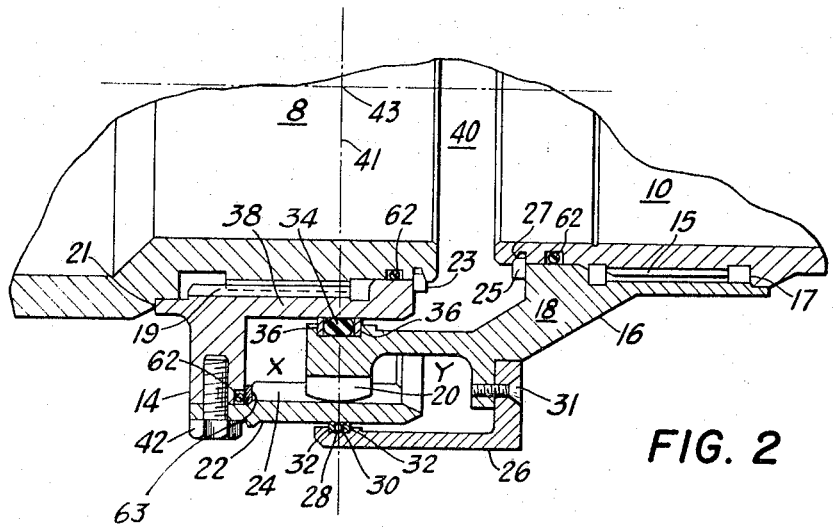

Referring now to FIG. 2, the substantially aligned and abutting shafts 8 and 10 are coupled in driving relationship by coupling 11. A hub 14 is mounted for rotation with shaft 8 and a hub 16 is mounted for rotation with shaft 10. Splines 15 on the shaft 10 engage slots in the bore of hub 16. Axial location of hub 16 on shaft 10 is accomplished by urging hub 16 against a shoulder 17 provided on shaft 10 with a snap ring 25 seated in a suitable groove 27 provided in shaft 10. Similarly, hub 14 is secured to shaft 8 by splines, shoulder 21 and snap ring 23 in a groove in shaft 8.

Hub 16 has an axially extending sleeve portion 18 on which external spur gear teeth 20 are formed. Hub 14 has an axially extending sleeve portion 22 on which internal spur gear teeth 24 are formed and which axially overlap the external teeth 20 in driving relationship. The external teeth 20 are made in the conventional manner and cooperate with the internal teeth 24 to permit angular and axial misalignment of the respective shafts 8 and 10.

An axially extending flange portion 26 is provided on hub 16 so that it axially overlaps the sleeve portion 22 of hub 14. As illustrated herein portion 26 is secured to hub 16 by bolts 31. An internal annular groove 28 is provided in flange portion 26 in which an O-ring 30 and back-up rings 32 are placed so that the O-ring bears against sleeve portion 22 to effectively seal lubricant within a cavity X–Y surrounding the meshing gear teeth.

The inside circumference of sleeve 18 of hub 16 has a similar groove formed therein in which is placed an O-ring 34 and back-up rings 36 which bear against an internal axially extending flange 38 formed on hub 14 and axially overlapped by sleeve 18 to effectively seal fluids within the hollow portions 40 of the respective shafts and seal lubricant within cavity X–Y. The back-up rings 32 and 36 prevent extrusion of the O-rings 30 and 34 due to pressure differentials across the rings.

Advantageously, O-rings, generally referred to by numeral 62 although of different sizes, are placed in suitable grooves where the various components of the coupling are joined to prevent the escape of fluids through the joints. As indicated in FIGURE 2, a shim ring 63 is preferably placed between O-ring 62 and teeth 24 to contain the O-ring in its groove.

Conventionally, the sleeve portion 22 having internal spur gear teeth 24 formed therein is made separate from the hub portion 14 with the sleeve portion 22 joined to the hub 14 by means of axially extending bolts 42 threaded into the sleeve portion 22 through an opening provided in the hub portion 14. Advantageously, when space requirements do not permit this type of connection, the bolts 42 may extend radially through the sleeve portion 22 into the hub 14.

In accordance with this invention, chamber X–Y contains a lubricant such as oil and this lubricant is sealed from the atmosphere by O-ring 30 and back-up rings 32. The lubricant is sealed from the fluids in hollow portions 40 by O-ring 34 and back-up rings 36. As shown in FIG. 2, a radial plane 41 passes through the center of the axial length of teeth 20 and intersects the axis of rotation of hub 16 at point 43, hereinafter referred to as the hinge point. It can be seen that if hub 14 is held stationary and the hub 16 is moved angularly with respect to hub 14, then hub 16 will pivot about hinge point 43. The O-rings 30, 34 with their adjoining back-up rings are advantageously axially centered on the plane 41 and are deformed by angular misalignment of the shafts to a minimal extent at this location. An additional advantage is that the O-rings are placed in grooves made in the sleeves 26, 18 of hub 16 so that if there is an axial separation of shaft 8 and shaft 10, the O-rings will remain axially located on radial plane 41. Thus the O-rings are always in the position of being affected to a minimal extent by angular misalignment of the shafts.

I claim:

1. A flexible coupling for connecting first and second shafts comprising:
   a first hub on said first shaft having a sleeve portion with internal spur gear teeth formed therein;
   a second hub on said second shaft having a sleeve portion with external spur gear teeth formed thereon for operative engagement with said internal gear teeth; and
   a seal comprised of first and second sealing means between said hubs lying in a radial plane passing through the center of the axial length of said external spur gear teeth, said second hub having an outer portion overlying the sleeve portion of said first hub, said first sealing means being interposed between said first hub sleeve portion and said overlying portion, said first hub having an inner portion underlying the sleeve portion of said second hub, and said second sealing means interposed between said second hub sleeve portion and said underlying portion, each of said sealing means lying in said radial plane.

2. The coupling of claim 1 wherein the chamber defined by the outer portion of said second hub and the underlying portion of said first hub is filled with lubricant.

3. The coupling of claim 2 wherein the first and second shafts are hollow and the coupling transmits fluid from one hollow shaft to the other.

4. A flexible coupling for connecting first and second shafts comprising:
   a first hub on said first shaft having a sleeve portion with internal spur gear teeth formed therein;
   a second hub on said second shaft having a sleeve portion with external spur gear teeth formed thereon for operative engagement with said internal gear teeth; and
   sealing means between said hubs lying in a radial plane passing through the center of the axial length of said external spur gear teeth, said first hub having an inner portion underlying the sleeve portion of said second hub and said sealing means being positioned between the sleeve portion of said second hub and said inner portion, said sealing means being fixed to said second hub sleeve portion and being movable on said underlying portion whereby said sealing means remains positioned in said radial plane regardless of shaft separation.

References Cited
UNITED STATES PATENTS

| | | | |
|---|---|---|---|
| 2,565,770 | 8/1951 | Johnson | 64—9 |
| 2,712,740 | 7/1955 | Boyd | 64—9 |
| 2,853,860 | 9/1958 | Crankshaw | 64—9 |
| 2,873,589 | 2/1959 | Crankshaw | 64—9 |
| 3,070,979 | 1/1963 | Shipley et al. | 64—9 |

HALL C. COE, *Primary Examiner.*